Figure 1:
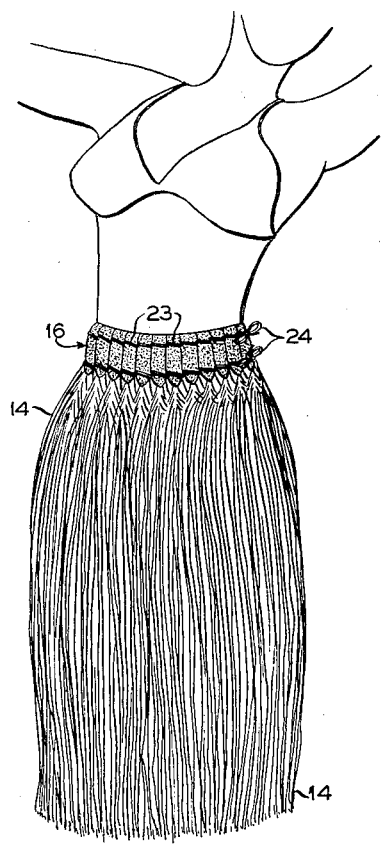

March 27, 1951 T. M. RODIN ET AL 2,546,563
HULA SKIRT
Filed April 4, 1949

INVENTORS
F. M. RODIN
T. M. RODIN
BY A. Yates Dowell
ATTORNEY

Patented Mar. 27, 1951

2,546,563

UNITED STATES PATENT OFFICE 2,546,563

HULA SKIRT

Theresa M. Rodin and Fred M. Rodin, Honolulu, Oahu, Territory of Hawaii

Application April 4, 1949, Serial No. 85,280

6 Claims. (Cl. 2—211)

This invention relates to articles of clothing and more particularly to a skirt of the character commonly referred to as a "hula" skirt and adapted to be worn by dancers engaged in certain of the ancient as well as modern Polynesian dances.

These dances, despite the antiquity of their origin, remain substantially unchanged, and combine graceful movements of the body with expressive gestures of the hands, to perpetuate an ancient sign language adapted to relate the narrative portrayed by the dance, virtually as meaningfully as the spoken word.

A true hula skirt, of the character with which we are presently concerned, is formed from leaves of the ti plant or ti leaves (proper pronunciation being as in "tea"). The brilliantly green leaves of this plant are hardly in nature, with an especially sturdy petiole or stem, and range in size up to three or three and one-half feet in length and six or more inches in width, curving into a somewhat gently pointed extremity. However, despite the sturdy characteristics of this plant and its leaves, the useful life of a ti leaf skirt is a comparatively brief one and, even with extreme care, visible indications of dryness and resultant loss of flexibility prevent the successful use of a skirt of this character over a greater period of time than three or possibly four days.

The construction of a ti leaf skirt is by no means a difficult or complicated task, albiet a somewhat tedious one. A requisite quantity of freshly picked ti leaves are obtained, of an appropriate size in accordance with the length of skirt desired, and these leaves are permitted to soak in water for several hours. The leaves are then removed, surface water is shaken off, and the upper extremities of the petioles are first stripped to reduce the thickness thereof and are then secured in close side-by-side relationship to any suitable tie-member, as will be described more fully hereinafter.

This stripping is accomplished by partially cutting or slitting the petiole adjacent the midlength of the leaf and then manually removing approximately 50% of the thickness of the petiole by a "peeling" step, thus imparting requisite flexibility to the upper and thicker portion of the leaf. A suitable tie-member, comprising a cord or the like of sufficient length and strength to serve as a belt is then secured, adjacent one extremity thereof, to some fixed point or object and a second cord or the like, doubled and of substantially greater length than the first, is secured to the tie-member immediately adjacent to the fixed point and in such a manner as to have two free extremities. The upper extremity of the petiole of a single ti leaf, which projects some four to six inches beyond the leaf proper and is light green in color in contrast to the dark green of the leaf, is then bent approximately in half and looped over the tie-member, the loose extremities of the second cord being plaited about the looped petiole, thus flexibly securing the ti leaf in position upon the tie-member. This process is repeated for each ti leaf until a skirt of the required width has been obtained, whereupon the loose ends of the plaiting cord are securely tied to prevent the skirt thus formed from coming apart. It is then customary to take an additional cord and repeat the plaiting process, at a point slightly spaced from the tie-member, adjacent the extremities of the looped portions of the petioles, and any uneven edges of said looped portions are preferably trimmed away. It has been found desirable to then place the skirt upon some flat surface and to trample the tied, looped portion with the bare feet to soften and increase the flexibility thereof.

The skirt is then rolled loosely within wet paper or cloth and permitted to remain thus rolled up for hours, in fact until prior to the time when the skirt is to be worn. It is then removed from the wrappings, shaken out, and, using either a sharp knife or the thumb nail, each leaf is laboriously shredded along its natural veins, from adjacent both sides of the petiole to the edges of the leaf. The width of these shredded portions may vary as desired from approximately one-half to three-quarters of an inch. When worn by a dancer, a skirt thus formed and shredded, produces a pleasingly melodious rustling noise, akin to the sound produced by the fronds of palm trees, stirring in a breeze.

So-called hula skirts have been manufactured commercially heretofore, produced from dried grass, straw, strands or threads of cotton or silk, strips of cellophane, or the like. While the dried grass skirt resembles that worn by the Samoans, all of these skirts are not only far from satisfactory when used for dancing the hula but are also extremely perishable by the very nature of the materials employed in the manufacture thereof.

It is accordingly a major object of the present invention to provide an improved hula skirt formed from artificial ti leaves.

It is a further object of the invention to provide a novel process for making artificial ti leaves so closely resembling natural ti leaves as to defy casual detection.

It is a still further object of the present invention to provide an improved hula skirt which may be economically manufactured, will be formed of substantially non-perishable material and will be a facsimile reproduction of a natural ti leaf skirt.

Figure 2:
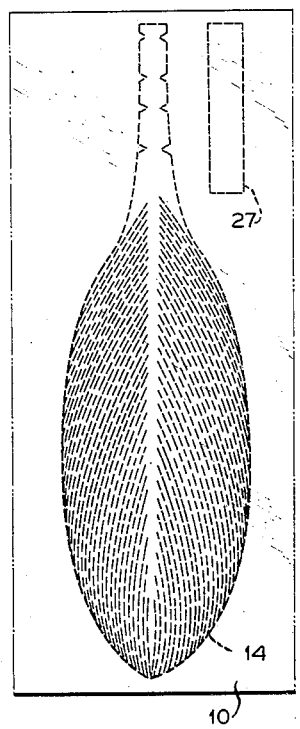
Figure 3:
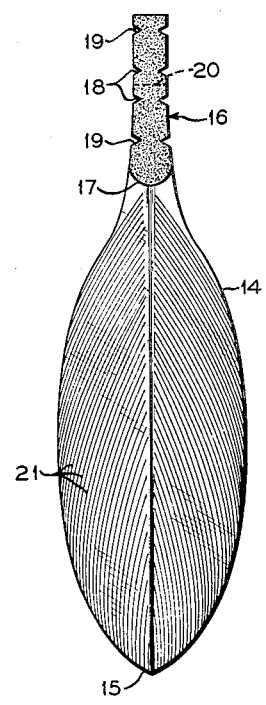
Figure 4:
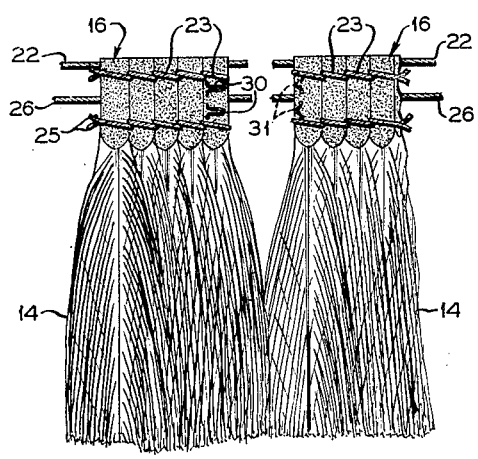
Figure 5:
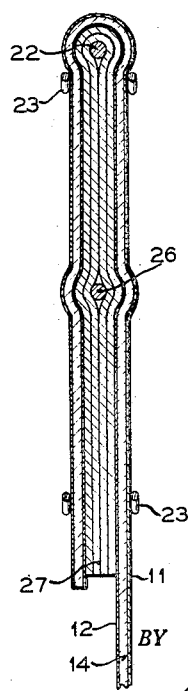
Figure 6:
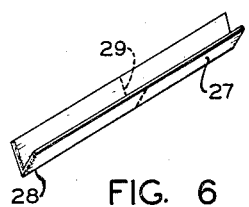

Further objects and advantages of the invention will be apparent from the following specification, taken in conjunction with the accompanying drawing, wherein:

Fig. 1 is an elevational view illustrating a ti leaf skirt constructed in accordance with the present invention, upon the figure of a dancer;

Fig. 2, a plan view of a piece of suitable material out of which the artificial ti leaf of the present invention may be cut or stamped, the leaf and a reinforcing member being indicated in dotted lines;

Fig. 3, a front elevational view of an artificial ti leaf, formed in accordance with the present invention;

Fig. 4, a fragmentary front elevation of a portion of a hula skirt, illustrating a preferred manner in which the artificial ti leaves are secured to a tie-member to form the skirt;

Fig. 5, a transverse detail sectional view, on a somewhat enlarged scale, taken on the line 5—5 of Fig. 4; and, Fig. 6, a detail perspective view of a reinforcing member.

As shown in the drawing, the artificial ti leaf of the present invention is cut or stamped from any suitable material 10, such as fabric or the like, having the requisite body or weight to provide a substantial leaf. Preferably such material is of a brilliant green color, to closely resemble the natural leaf, however, color forms no part of the present invention, it being obvious that under conditions where colors other than the green contemplated are considered desirable, any color or color combination might be advantageously employed.

An inexpensive fabric which lends itself particularly well for use in the present invention is the widely known green window shade material, however, the invention is not limited to the use of this material as countless other fabrics may be employed with entirely satisfactory results. The color of this material is particularly appropriate and the weight or body thereof is also adequate. To add a glossy finish to this material, the outer surface thereof is coated with any suitable, transparent and glossy plastic paint as indicated at 11 in Fig. 5 of the drawing, satisfactory paints of this character being readily obtainable commercially. A coating of this character has complete flexibility and imparts to the material a durable finish of extremely high gloss.

To prevent any possibility of cracking it has been found desirable to coat the opposite side of the fabric with a plastic rubber fabric paint, also readily obtainable commercially and indicated at 12. Such a coating will permeate the fibers of the threads from which the fabric is woven and will result in a highly flexible material which will not crack even under deliberate pressure.

It has been found in practice that where relatively coarse fabric materials are coated on their opposite sides with plastic paints having the above referred to characteristics, the resultant product is pleasing to the eye and smooth to the touch. It is durable and flexible and of remarkably long life, displaying a marked resistance to external influences.

As indicated more particularly in Fig. 2 of the drawing, an artificial ti leaf 14 is cut or stamped out of the material treated or coated as set forth hereabove. Preferably this artificial ti leaf, which may be of any desired size or shape, closely approximates the natural leaf, curving gently into a somewhat pointed extremity 15 and including an upper portion 16 of reduced width, representing the petiole of the leaf. If desired, this petiole portion may be colored, or painted, a light green, as indicated at 17, to conform more closely to the coloration of the natural ti leaf. It has been found beneficial to crease or fold the leaf longitudinally, such a crease creating the illusion, after the leaf is unfolded, that the petiole is a natural one, extending to the tip of the leaf.

Opposed pairs of notches 18 and 19 are provided on the edges of said reduced portion so disposed that when this petiole portion is doubled or bent along the dotted line 20, see Fig. 3 of the drawing, the two pairs of notches will be positioned in overlaying relationship to readily lend themselves to a plaiting or tying operation as will be more fully described hereinafter. It will be obvious that while only two sets or pairs of such notches have been illustrated, three or more sets may be provided, dependent upon the length of the petiole and the number of plaiting cords desired.

The artificial leaf thus formed is shredded, as indicated at 21, from points adjacent the center of the leaf or petiole indication, to both edges of the leaf. The width of these shredded portions may vary, as desired, from approximately one-half to three-quarters of an inch and while they have been indicated along straight lines, angularly disposed with respect to the longitudinal axis of the leaf proper, gradually increasing curves, paralleling to a major extent the curvature of the leaf as is true with the veins of the natural leaf, have been found highly satisfactory.

It will be obvious to those skilled in the manufacture of fabric garments in general, that a single stamping operation through a multiplicity of pieces of material would provide numbers of artificial ti leaves as described above, complete with notched petiole and shredded leaf proper. In this manner, with dies of different sizes in accordance with the length of the skirt desired, quantity production would be particularly economical, presenting no problems.

While any number of methods may be employed for assembling such artificial leaves into finished skirts, the time-honored method, described hereinbefore is considered most satisfactory. The petiole portion 16 of each leaf 14 is bent as at 20 and looped over a tie-member 22 of appropriate length and strength. A cord or the like 23 is then plaited around the looped petiole portion, the complementary pairs of notches 18 serving to retain this plaiting cord in position substantially adjacent to the tie-member 22. These steps are repeated for each leaf required and, when a desired width has been attained, the extremities of the plaiting cord 23 are knotted or otherwise secured to prevent the garment from coming apart. Preferably the length of the tie members 22 and 26 is such that they project beyond the first and last leaf of the skirt and may be tied to retain the skirt upon the figure of the user, as indicated more particularly at 24 in Fig. 1 of the drawing. If desired, hooks and eyes of conventional manufacture and indicated at 30 and 31 in Fig. 4 of the drawing may be employed as fastening means and may be substituted for or used to supplement the tieing of the members 22 and 26. It has been found in practice that, generally, employing ties 24 provides a more snug fit about the hips of the wearer.

It will be noted that the leaves 14 are secured upon the tie-member 22 in closely abutting side-by-side relationship to leave no undesirable gaps in the garment. To further retain the leaves in proper assembled relationship a second plaiting cord 25 is provided, intended to cooperate with the complementary pairs of notches 19 which are positioned in overlaying relationship immediately adjacent the extremity of the petiole portion 15. If desired, a second tie-member 26 may be provided, positioned between the plaiting cords 23 and 24 and substantially similar to the tie-member 22. Such a second tie-member is advantageous in skirts of greater lengths, adapted to be worn by taller persons, where the length of the doubled over petiole portion is proportionately increased. In such skirts a third and intermediate plaiting cord may be used to advantage.

For additional strength, since the fabric from which these artificial leaves are formed is comparatively thin, a reinforcing member 27 may be incorporated into each doubled petiole portion. Preferably such reinforcing members are substantially rectangular in shape and, as indicated in Fig. 2 of the drawing, may be cut or stamped out of the identical fabric from which the leaves are formed. In a preferred embodiment, each reinforcing member is doubled upon itself as at 28 and then again doubled or folded along the line 29. The fold 29 overlaps the tie-member 22 and the plaiting cords 23 and 25 prevent displacement of the reinforcing member which, without adding materially to bulk, measurably strengthens the skirt.

There has thus been described a novel method for making an artificial ti leaf and an improved method for assembling a plurality of such leaves to form a skirt-like garment. Each leaf is a facsimile of a natural ti leaf and under casual observation will defy detection. The material from which such artificial leaves are formed has been so treated as to eliminate each of the difficulties and deficiencies encountered in a skirt of this character formed from natural leaves and the finished product is not only extremely durable but also of vastly improved appearance.

It will be obvious to those skilled in the art that various changes may be made in the invention without departing from the spirit and scope thereof and therefore the invention is not limited by that which is shown in the drawing and described in the specification but only as indicated in the appended claims.

What is claimed is:

1. An artificial ti leaf skirt comprising a plurality of fabric leaves coated on one side with a plastic paint and coated on the other side with a plastic rubber paint, spaced fastening means for securing said leaves and a tie-member to which said leaves are secured, each of said leaves including a shredded leaf portion and a petiole portion of reduced width doubled upon itself and looped over said tie-member, the edges of said petiole portion being provided with opposed pairs of notches adapted to receive said spaced fastening means whereby said leaves are secured to each other in side-by-side relationship, and reinforcing means for each looped petiole portion comprising a fabric strip of lesser width than the petiole portion, looped over said tie-member and retained in position by said spaced fastening means.

2. An artificial ti leaf skirt comprising a plurality of fabric leaves coated on one side with a plastic paint and coated on the other side with a plastic rubber paint, spaced fastening means for securing said leaves and a tie-member to which said leaves are secured, each of said leaves including a shredded leaf portion and a petiole portion of reduced width doubled upon itself and looped over said tie-member, the edges of said petiole portion being provided with opposed pairs of notches adapted to receive said spaced fastening means whereby said leaves are secured to each other in side-by-side relationship, and reinforcing means for each looped petiole portion comprising a fabric strip looped over said tie-member and retained in position within said petiole portion by said spaced fastening means.

3. An artificial ti leaf skirt comprising a plurality of fabric leaves and fastening means for securing said leaves, each of said leaves including a petiole portion doubled upon itself and looped over a tie-member, the edges of said petiole portions being provided with opposed pairs of notches adapted to receive said fastening means whereby said leaves are secured to each other in side-by-side relationship, and reinforcing means for each looped petiole portion comprising a fabric strip of lesser width than the petiole portion, looped over said tie-member and retained in position by said spaced fastening means.

4. A skirt formed from a plurality of artificial fabric leaves, each of said leaves including a petiole portion doubled upon itself and looped over a tie-member, and fastening means for securing said leaves, the edges of said petiole portions being provided with opposed pairs of notches adapted to receive said fastening means whereby said leaves are secured to each other in side-by-side relationship.

5. An artificial ti leaf formed from fabric coated on one side with a plastic paint and coated on the other side with a plastic rubber paint, each leaf including a shredded leaf portion and a petiole portion of reduced width with respect to said leaf portion, the edges of said petiole portion being provided with opposed pairs of notches adapted to receive fastening means whereby a plurality of leaves may be assembled in side-by-side relationship.

6. An artificial ti leaf formed from fabric coated on one side with a plastic paint and coated on the other side with a plastic rubber paint, each leaf including a shredded leaf portion and a petiole portion of reduced width with respect to said leaf portion.

THERESA M. RODIN.
FRED M. RODIN.

REFERENCES CITED

The following references are of record in the file of this patent:

UNITED STATES PATENTS

| Number | Name | Date |
| --- | --- | --- |
| 948,194 | Veit | Feb. 1, 1910 |
| 1,423,383 | Zaiden | July 18, 1922 |
| 1,831,559 | Ham et al. | Nov. 10, 1931 |